United States Patent [19]

Shimodaira et al.

[11] E Re. 28,796

[45] Reissued May 4, 1976

[54] COMPACT FLYING PRINTER

[75] Inventors: Takayoshi Shimodaira, Suwa; Yoshifumi Gomi, Chino, both of Japan

[73] Assignees: Kabushiki Kaisha Suwa Seikosha, Tokyo; Shinshu Seiki Kabushiki Kaisha, Suwa, both of Japan

[22] Filed: Apr. 9, 1975

[21] Appl. No.: 566,492

Related U.S. Patent Documents

Reissue of:

[64] Patent No.: 3,835,770
Issued: Sept. 17, 1974
Appl. No.: 248,368
Filed: Apr. 28, 1972

U.S. Applications:

[62] Division of Ser. No. 118,427, Feb. 24, 1971.

[30] Foreign Application Priority Data

Feb. 27, 1970 Japan ..... 45-16451

[52] U.S. Cl. ..... 101/93.31; 101/100; 101/107; 197/127 R; 197/133 R; 197/162; 226/120

[51] Int. Cl.[2] ..... B41J 27/00

[58] Field of Search ..... 101/93.18, 93.31, 93.28, 101/93.29, 96, 100, 107, 93.32, 66, 93.3, 93.02; 226/120; 197/127 R, 133 R, 162, 151

[56] References Cited

UNITED STATES PATENTS

| | | | |
|---|---|---|---|
| 2,766,686 | 10/1956 | Fomenko et al. | 101/93 C |
| 2,800,990 | 7/1957 | Williams | 197/162 |
| 2,886,162 | 5/1959 | Eissfeldt et al. | 197/162 |
| 2,897,752 | 8/1959 | Malmros et al. | 101/93 C |
| 2,906,203 | 9/1959 | Grosse | 197/162 X |
| 2,949,846 | 8/1960 | Hoffman et al. | 101/93 C |
| 3,100,037 | 8/1963 | Green et al. | 197/127 R |
| 3,122,995 | 3/1964 | Adler et al. | 101/66 |
| 3,139,820 | 7/1964 | Kittler | 101/93.31 |
| 3,156,180 | 11/1964 | Barnes | 101/93 R |
| 3,171,530 | 3/1965 | O'Daniel et al. | 197/151 |
| 3,175,487 | 3/1965 | Braden | 101/93.31 |
| 3,217,855 | 11/1965 | Haberkorn et al. | 197/127 R X |
| 3,218,966 | 11/1965 | Petit | 101/96 X |
| 3,292,531 | 12/1966 | Mutz | 101/93.3 |
| 3,351,007 | 11/1967 | Polano | 101/93.3 |
| 3,386,376 | 6/1968 | Mutz et al. | 101/93.02 |
| 3,409,114 | 11/1968 | Okuda | 197/151 |
| 3,461,797 | 8/1969 | Trab et al. | 101/96 |
| 3,598,046 | 8/1971 | Hirabayashi | 101/93.31 |
| 3,623,428 | 11/1971 | Imahashi | 101/93.31 |
| 3,623,429 | 11/1971 | Imahashi | 101/93.31 |
| 3,648,602 | 3/1972 | Avgerinos et al. | 101/93.31 |
| 3,666,069 | 5/1972 | Suzuki | 197/151 |
| 3,673,956 | 7/1972 | Huber et al. | 101/93.31 |

*Primary Examiner*—E. H. Eickholt
*Attorney, Agent, or Firm*—Blum, Moscovitz, Friedman & Kaplan

[57] ABSTRACT

A compact flying printer having a continuously rotating print drum and ratchet wheel, a trigger lever positionable to be struck by a tooth of said ratchet wheel and a hammer lever driven by said trigger lever and provided with a print hammer at its end. The trigger lever is formed with a linear guide portion for regulating the motion thereof and an energy transmitting portion projected for transmitting energy from said ratchet wheel to said hammer lever.

11 Claims, 28 Drawing Figures

COMPACT FLYING PRINTER

Matter enclosed in heavy brackets [ ] appears in the original patent but forms no part of this reissue specification; matter printed in italics indicates the additions made by reissue.

This is a division, of application Ser. No. 118,427, filed Feb. 24, 1971.

BACKGROUND OF THE INVENTION

This invention relates to a compact flying printer utilized in electronic desk calculators and other numerical read out devices. In such printers, the hammer strikes a selected character from an array of characters provided in columnar fashion on the periphery of a continuously rotating print drum. However, the known arrangements of this type of printer have several substantial drawbacks. Specifically, shear will occur in the printing process if the contact time between the hammer and the print drum is too great, resulting in smudged printing or ripped paper. In order to overcome this defect, the contact time of the hammer with the character must be shortened, thereby increasing the operating speed of said hammer. In the conventional printers of the type described the hammer is directly operated by electromagnets, and an increase in the operating speed of the hammer requires an increase in the size and power of said electromagnets. However, an increase in the size and power of the electromagnets results in an increase in the volume of the printer and requires increased electric power consumption, and is therefore undesirable. To avoid the above-described defects, a device wherein the energy for printing can be obtained from a continuously rotating body is utilized.

SUMMARY OF THE INVENTION

The object of this invention is to provide a high speed compact flying printer.

Another object of this invention is to provide a flying printer with precise operation.

A further object of this invention is to provide a flying printer of simple construction with minimum number of components, which enables easy assembly and mass scale production.

A further object of this invention is to provide a flying printer with small electric power consumption.

In the compact flying printer according to the invention, the hammer and hammer lever are made in one piece. In order to position the hammer exactly against the character on the print drum, a guide member having a guide groove or guide hole arranged in zig-zag form is provided. The trigger lever is formed with a guide portion in linear form and a transmitting portion projected from said guide portion. One end of the trigger lever is projected from the other surrounding parts and so that said trigger lever can be easily taken out after finishing assembly of the printer. The trigger lever strikes against the trigger lever stopper at its sloping portion to secure precise operation. Inked ribbon winding, color changing of ribbon and paper feeding are driven by the motor device of the printer. The above devices are mounted on one side of the printer. The main components for printing are housed in a unit. A guide plate for paper feeding is wave formed to advance the paper smoothly. Thus, clear printing can be obtained.

BRIEF DESCRIPTION OF THE DRAWINGS

For a fuller understanding of the invention, reference is had to the following descriptions taken in connection with the accompanying drawings, in which:

FIG. 3-a is a front elevational view of a hammer lever guide plate of the flying printer of this invention;

FIG. 13-a is a sectional view of the device shown in FIG. 13;

DESCRIPTION OF THE PREFERRED EMBODIMENTS

Figure 1:
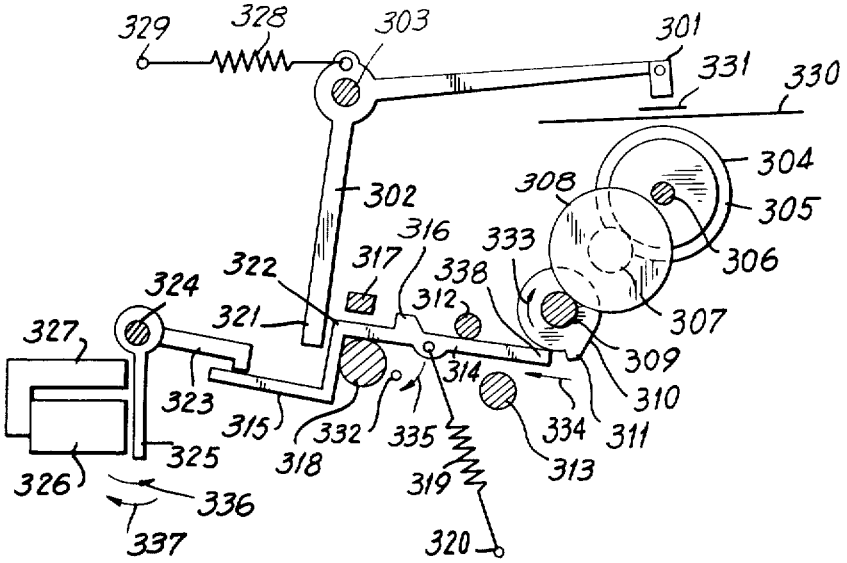
FIG. 1 PRIOR ART
FIG. 1 is a schematic representation showing the operation of a conventional flying printer.
Figure 3A:
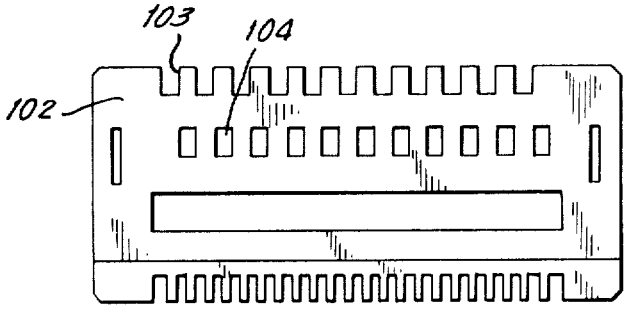
FIGS. 2 and 3 are perspective views of the flying printer according to the invention.

FIG. 1 is a schematic representation of one column of a conventional type of a flying printer wherein 301 is a print hammer, 302 a hammer lever, and 303 a rotary axis for said hammer lever. Disposed immediately below hammer 301 is a print drum 304 having print characters spaced apart on the peripheral surface thereof. The print drum 304 and a print drum gear 305 are mounted for rotation on a print drum shaft 306. The print drum gear 305 meshingly engages an intermediate pinion 307 which is adapted to drive an intermediate gear 308 fixed thereto. 310 is a ratchet wheel, 311 a pawl extended from the ratchet wheel, 312 a trigger lever pin A, and 313 a trigger lever pin B. A trigger lever 314 is formed with a tail portion 315 and a projection 316. 317 is a trigger lever stopper. A trigger lever guide 318 is provided to guide the trigger lever 314 during displacement of the trigger lever. A spring 319 is secured between lever 314 and a fixing point 320 for biasing the end 338 of the trigger lever .4 out of the locus of the pawl 311. The end 321 of e arm of hammer lever 302 is engageable by a shoul- :r 322 of the trigger lever 314 upon linear displace- ent of the latter, causing the hammer lever 302 to vot and the hammer 301 to strike print drum 304 via ıper 330, upon which a character is to be imprinted, ıd an inked ribbon 331 which are interposed between e hammer 301 and the print drum 304. A timing lever 23 is disposed to engage tail 315 of trigger lever 314 ıd is pivotably mounted on a timing lever shaft 324. xed to the timing lever 323 is a magnetic plate 325 ovement of which is controlled by electromagnets 26 and 327. A spring 328 is mounted between the ırner of hammer lever 302 and a fixing point 329 to ırmally bias said hammer lever in the position shown ith hammer 301 spaced from print drum 304. 329 is a king point of spring 328, 332 is a center of gravity of ıid trigger lever.

In FIG. 1, only one column is illustrated by way of cample. However, an actual printer would include the esired number of columns, each of which would comrise a hammer 301, a hammer lever 302, a trigger ver 314, a trigger lever spring 319, a timing lever 323, magnetic plate 325, electromagnets 326 and 327, and hammer lever spring 328.

When the flying printer is activated but no timing gnals are applied to the electromagnets or to the aper advance mechanism, a motor continuously roates the ratchet wheel 310 in the direction of arrow 33, thereby also rotating the print drum 304 in the ame direction through the intermediate gears 307 and 08. On the surface of the print drum 304, many colmns each including all the characters to be printed are isposed. Pawl 311 is provided on the surface of the atchet wheel 310. The gear ratio between the ratchet /heel 310 and the print drum 304 is selected so that he pitch time of the pawl equals the circumferential pacing of the characters on the peripheral surface of he print drum 304. Thus, each rotation of the pawl orresponds to the advancing of one character on the ırint drum. For example, if there are 16 characters on he print drum and one pawl is on the ratchet wheel, he rotational ratio between the ratchet wheel and the ırint drum is 16:1 In non-printing condition, the elecromagnets 326 and 327 are not actuated electrically, ınd the trigger lever 314 is biased to the direction of he spring fixing point 320 by means of the spring 319, ınd is positioned by means of the trigger lever guide 318. Therefore, the end 338 of the trigger lever 314 is ılaced lower than the position shown in FIG. 4, and the ıawl 311 does not engage with the end 338 of the :rigger lever 314. Magnetic plate 325 is biased to the lirection of the arrow 336 by the force of the spring 319.

In order to print a desired character on the paper 331 by means of the hammer 1 when the print command enters in the control circuit, the electromagnets 326 and 327 are energized immediately before the desired character on the peripheral surface of the print drum 304 passes under the hammer 301. The energization of one of said electromagnets 326 and 327 rotatably displaces its respective magnetic plate 325 in the direction of the arrow 337. This rotating force is transmitted to the trigger lever 314 through the trigger lever tail 315. Thus the trigger lever 314 rotates in the counterclockwise direction around the trigger lever guide 318 and touches the trigger lever guide 312 to be positioned thereby.

FIG. 1 shows this state. When the ratchet wheel 310 further rotates, the pawl 311 engages with end 338 of trigger lever 314. The linear displacement of the trigger lever 314 is transmitted to the arm 321 of the hammer lever 302 by means of the shoulder 322 of the said trigger lever. Said hammer lever is in turn rotated in the counterclockwise direction causing the hammer 1 to strike the print drum through inked ribbon 331 and paper 330 at the moment when the desired character is positioned under said hammer.

This type of printer, as will be clear from the above description and FIG. 1, has disadvantages as follows. Since one end 338 of said trigger lever is struck by the pawl 311 and the other end of said trigger lever engages with the timing lever 323, the trigger lever occupies a large space in the longitudinal direction due to its long shape and it is not suitable as a compact flying printer. As the guide members 312, 313 and 318 for the trigger lever are separately mounted, construction becomes complicated. Besides, as the trigger lever is encompassed by the guide members 312, 313 and 318 and the stropper 317, assembly becomes difficult. It is necessary to remove said guide member in case of repair. The engaging point between the trigger lever stopper 317 and the trigger lever projection 316 is on the upper portion of the center of gravity of motion direction, so motion of the trigger lever after striking against the stopper 317 is large and so it is not suitable for a compact printer.

The present invention seeks to eliminate the above defects.

Figure 2:
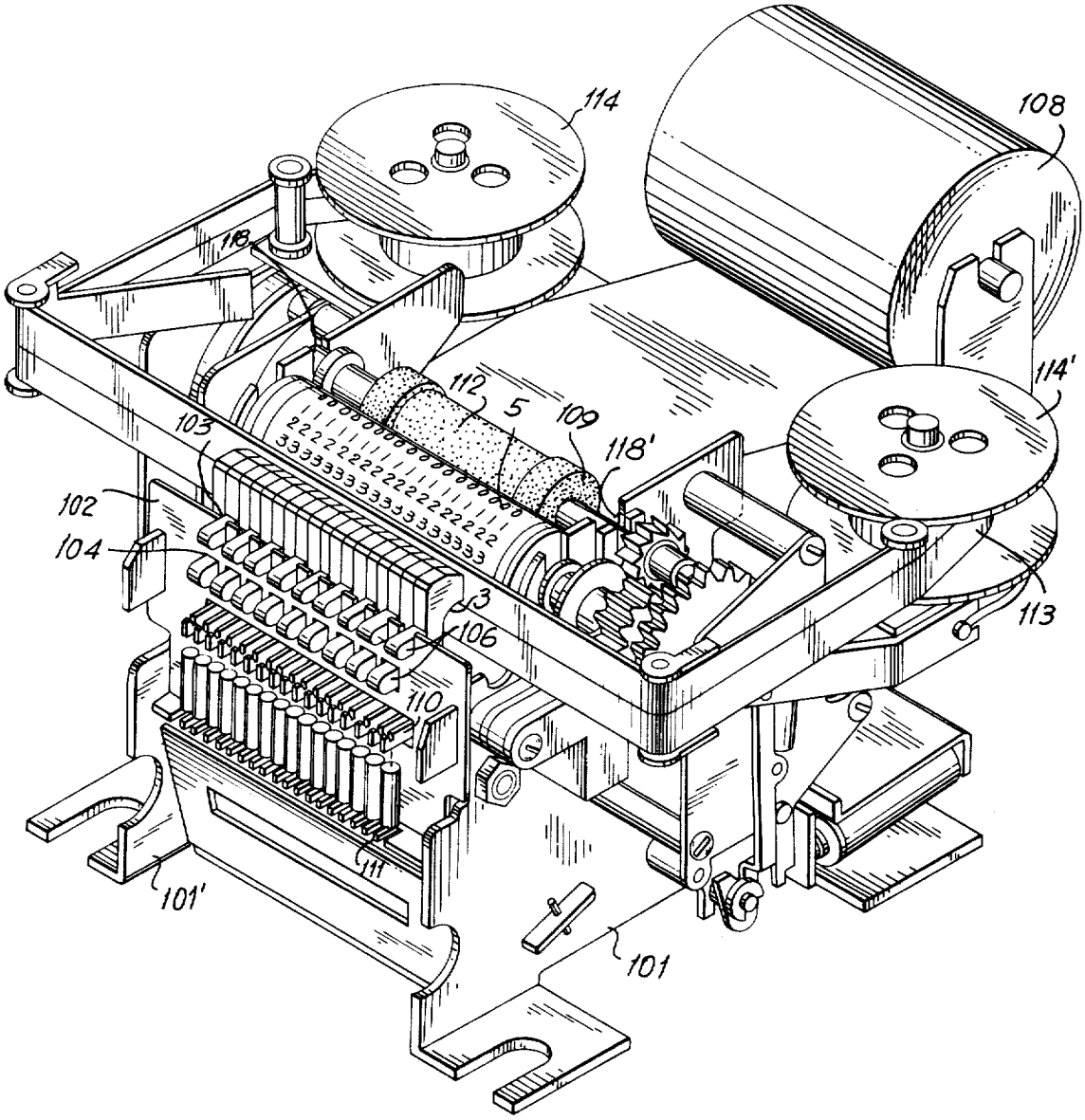

FIG. 2 is a perspective view of the printer according to the invention, wherein 101 and 101' are main frames, 102 a hammer lever guide plate for guiding the hammer levers 3 in a fixed position, 5 a print drum, 108 a paper, 112 a paper feeding roller for advancing the paper, 113 an inked ribbon, 114 a spool for said inked ribbon.

Figure 3:
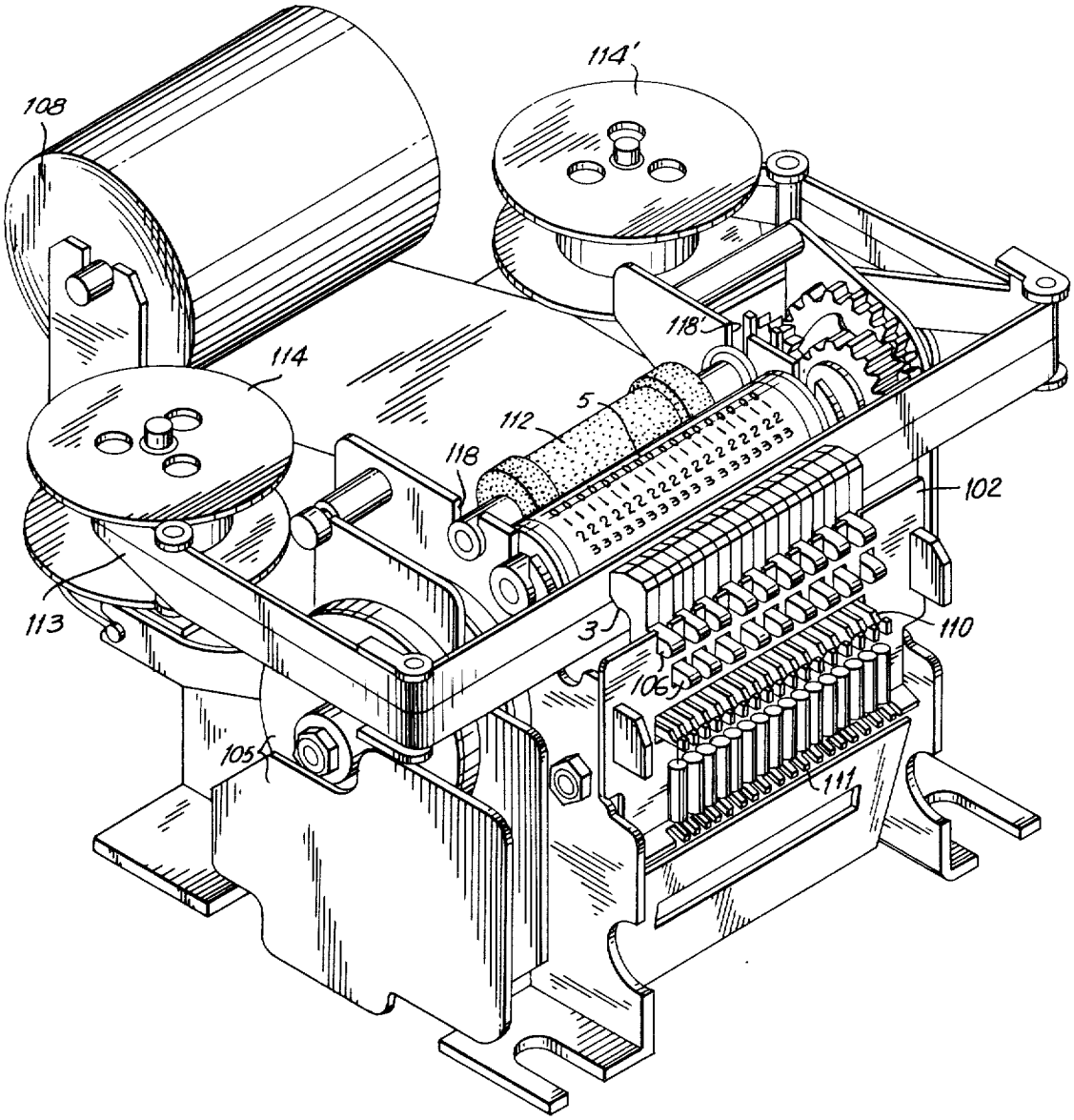

FIG. 3 is a perspective view of the printer according to the invention viewed from the other side having motor device 105 mounted thereon.

Figure 4:
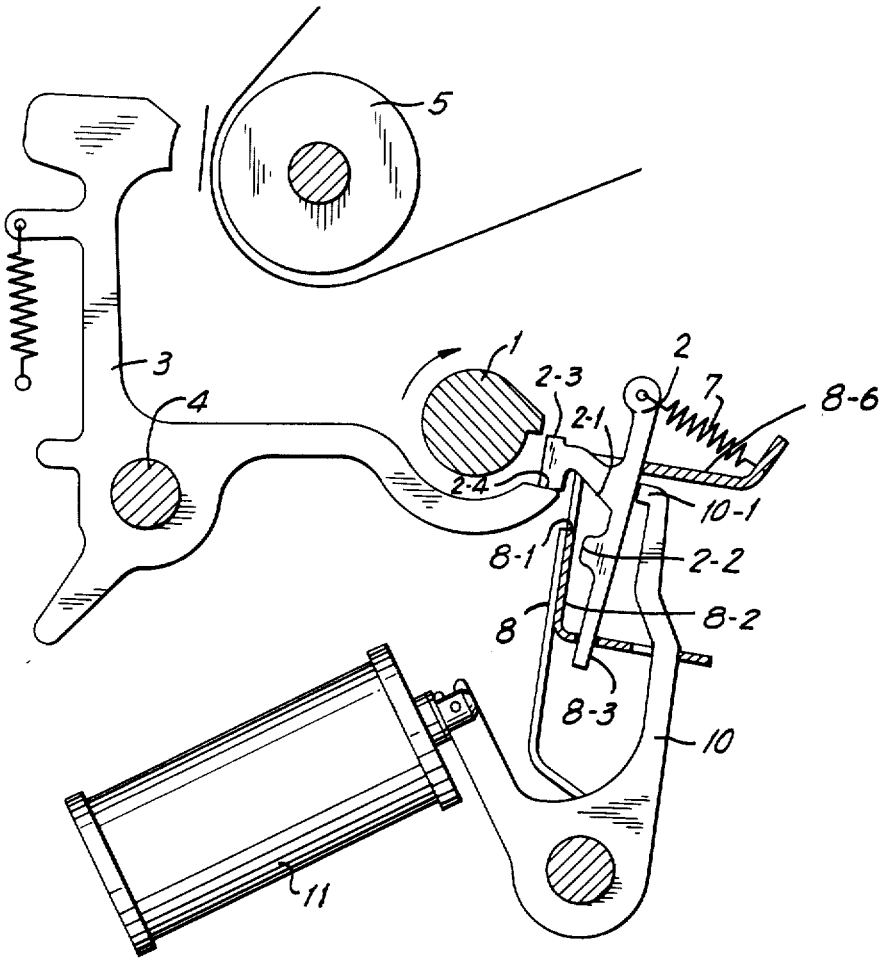
FIGS. 4, 5, 6, 7 and 8 are sectional views describing the operation of the flying printer of this invention.
Figure 5:
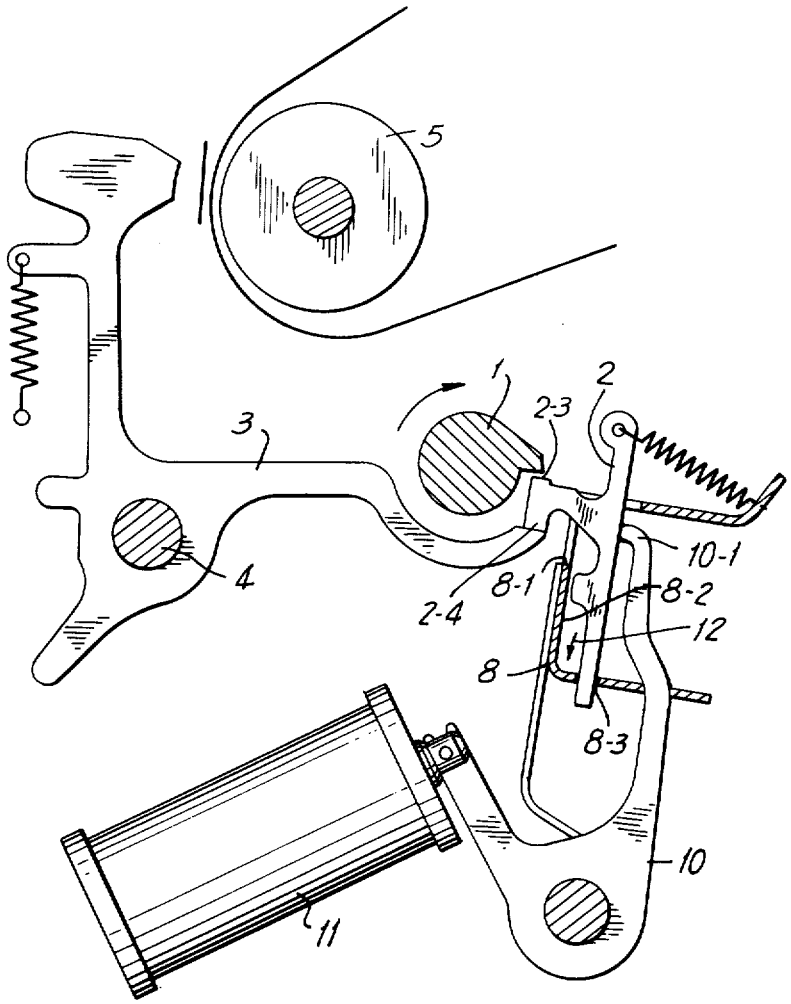
Figure 6:
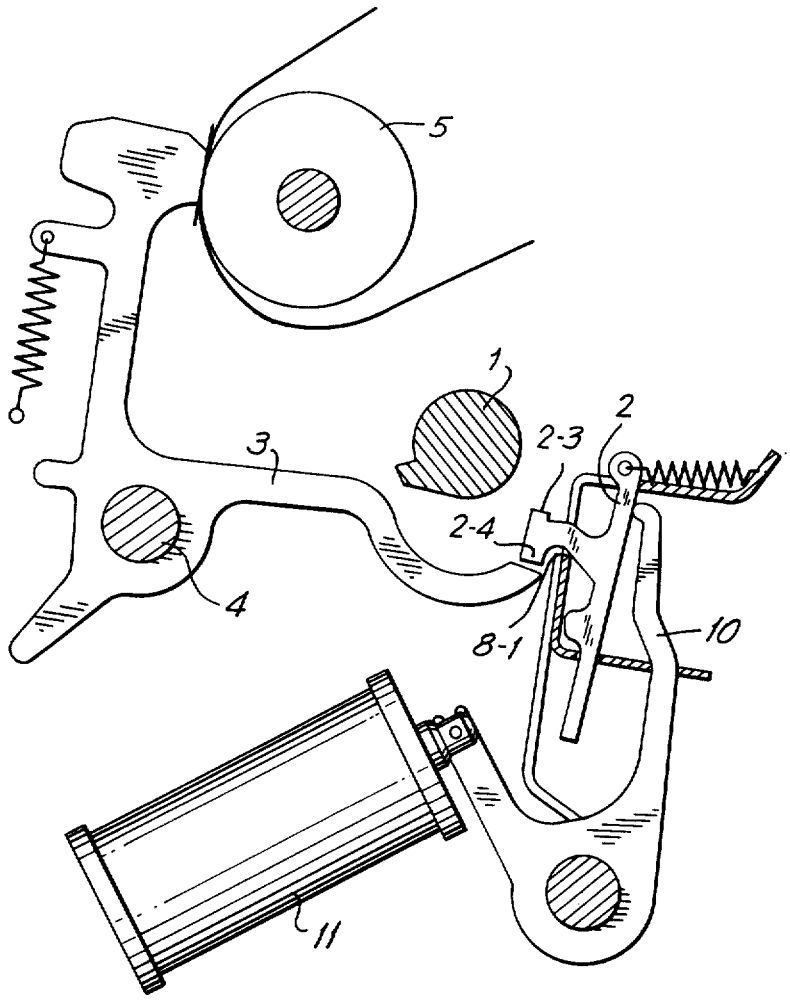

FIGS. 4, 5 and 6 show the construction of one column according to the invention. 1 is a ratchet wheel rotating continuously at a constant speed drive by the motor. The trigger lever 2 is guided by the trigger lever guides 8–3 and 8–6. The trigger lever is biased out of the locus of the ratchet wheel 1 when the plunger 11 is not energized. The trigger lever 2 and the trigger lever regulating plate 8 have stopper faces 2–1, 2—2, 8–1 and 8–2 respectively against which the trigger lever strikes when it is actuated. The hammer lever 3 is pivoted on the axis 4. Print drum 5, having characters on the surface thereof, is rotated at a speed a predetermined ratio slower than that of ratchet wheel 1. The timing lever 10 controls the engaging depth of the trigger lever with the ratchet wheel. The plunger 11 operates according to the print command signal.

Referring to FIGS. 5 and 6 for describing the operation, the plunger 11 is energized and said lever rotates in the counterclockwise direction when the print command enters. At this moment, the trigger lever 2 is pushed by one end 10–1 of the timing lever and rotates in the counterclockwise direction around the contact point between tail 2–5 and the guide 8–3. Then the contact portion 2–3 of the triggr lever enters in the locus of the pawl of the ratchet wheel. The trigger lever is struck by the pawl and displaces linearly in the direction of the arrow 12. At the same time, the hammer lever 3 is struck by one end 2–4 of the trigger lever and rotates around the axis 4. Said contact portion 2–3 and one end 2–4 of trigger lever 2 constitute the energy transmitting portion of said trigger lever, said energy transmitting portion defining the end of a neck projecting laterally from the longitudinally extending body portion of the trigger lever engaging trigger lever guides 8–3 and 8–6. The tail 2–5 of said body portion extends through the aperture 8–3 in trigger lever guide 8 (see FIG. 9). The print hammer mounted on the end of the hammer lever strikes the print drum 5, and printing is performed. The trigger lever 2 strikes against the trigger lever stopper 8–1 immediately before the hammer strikes against the print drum and returns to its initial position. Without the trigger lever stopper 8–1, the hammer lever would strike again against the trigger lever during the return stroke to its initial position after receiving the repulsive force from the drum. Thus, ghost printing or double printing occurs, i.e., the same character or two characters are printed on the same place on the paper. The trigger lever stopper is provided to eliminate this defect. It is necessary to place this trigger lever stopper carefully in order to prevent the ghost printing or double printing, so that the trigger lever does not enter again in the locus of the ratchet wheel immediately after stroking against the trigger lever stopper 8–1.

On the other hand, when printing a symbol which does not occupy the space of one character such as comma (,) or decimal point (.), together with characters within the space of one character, e.g., "9," alphanumeric characters and symbols and characters such as comma and period are disposed in one column and by operating the hammer twice, the character (9) and symbol (,) are printed within one column, thus the printing time is shortened and high speed printer is obtainable.

In prior art arrangements, characters 0 1 2 . . . 8 9 . . . and symbols, and . are disposed on the print drum. For printing "9,", "9" is printed in the first rotational cycle of the print drum, and in the second cycle of rotation, "," is printed. Thus printing time is prolonged due to the second cycle rotation of the print drum.

Further, there is another method for printing "9,", wherein "9" is printed in one column, "," is printed in the next column. In this case printing time for two columns is necessary. Thus printing time is wasted by one character. Besides the number of characters is increased from 12 to 14. Therefore the size of the print drum is increased and high speed printer cannot be obtained.

The present invention seeks to eliminate the above defects and to provide a compact flying printer wherein the engaging portion of the ratchet wheel with the trigger lever is out of the locus of the ratchet wheel immediately after the ratchet wheel strikes against the trigger lever, so that undesirable double striking is prevented and the trigger lever is a little spaced from the trigger lever pin when the trigger lever is biased by the timing lever, so that the high speed printing can be performed precisely and continuously.

Now, reference is made to the action of the trigger lever when the print command signal is applied in and the trigger lever 2 is struck by the ratchet wheel. At the moment when the trigger lever 2 is struck by the ratchet wheel 1, the center of gravity of the trigger lever 2 is in such a position as shown by G in FIG. 7, and the engaging portion 2–3 between said lever and the ratchet wheel is above the center gravity G, the trigger lever 2 displaces in the direction of the arrow 12 rotating in the counterclockwise direction.

Suppose that the distance from the center of gravity G to the trigger lever portion which is struck by the tooth of the ratchet wheel is r and the distance from the center of gravity G to the axis of rotation a (center of striking) is R, we obtain from the equation of rotation when the rigid body is struck by the impulse:

$$rR=k^2 \qquad 1$$

wherein k=radius of rotation around the center of gravity of the trigger lever.

Therefore at the moment when the trigger lever 2 is struck by the ratchet wheel 1, the center of gravity of the trigger lever rotates around a toward-the-inside direction of the locus of the tooth of the ratchet wheel. However, rotation of the trigger lever is stopped by striking of the stopper face 2—2 of the guide portion of the trigger lever against the stopper face 8–2 of the regulating member 8 for the trigger lever and the trigger lever moves linearly in the direction of the arrow 16 to operate the hammer lever 3. The trigger lever stopper 8–1 is provided to prevent the double striking of hammer in such a manner that the trigger lever strikes against said stopper 8–1 immediately before the hammer strikes against the drum. However, this arrangement is not sufficient enough to prevent the double striking. After striking against the trigger lever stopper 8–1, the trigger lever may again return toward the inside of locus 14 of the pawl 1—1 of the ratchet wheel and strike an undesirable character.

The arrangement according to the invention is so designed that by placing the axis of rotation of the trigger lever properly immediately after the trigger lever 2 strikes against the stopper 8–1, the engaging portion 2–3 between the trigger lever and the ratchet wheel tooth is placed out of the locus of the pawl. Suppose that the center of gravity of the trigger lever when the trigger lever 2 strikes against the stopper 8–1 is G (FIG. 7), a distance from G to the line of action 15 of the impact force caused when the trigger lever strikes against the stopper 8–1 is l, and a distance from the center of gravity G to the rotary axis of the trigger lever after being struck by the ratchet wheel tooth is L, we obtain:

$$Ll=k^2 \qquad 2$$

If the striking between stopper or striking face point 2–1 of the trigger lever and the stopper 8–1 is below the locus 16 of the center of gravity of the trigger lever, the trigger lever 2 performs rotational movement toward the inside direction of the ratchet wheel 1 so that the trigger lever is engaged firmly with the tooth of the ratchet wheel. Therefore, it is required that the impact point on stopper or striking face 2–1 be above the locus 16 of the center of gravity in order that the trigger lever comes out of the locus of the pawl. On the other hand, double striking may occur depending upon the position of the rotary center when the trigger lever 2 strikes against the stopper 8–1.

Figure 7:
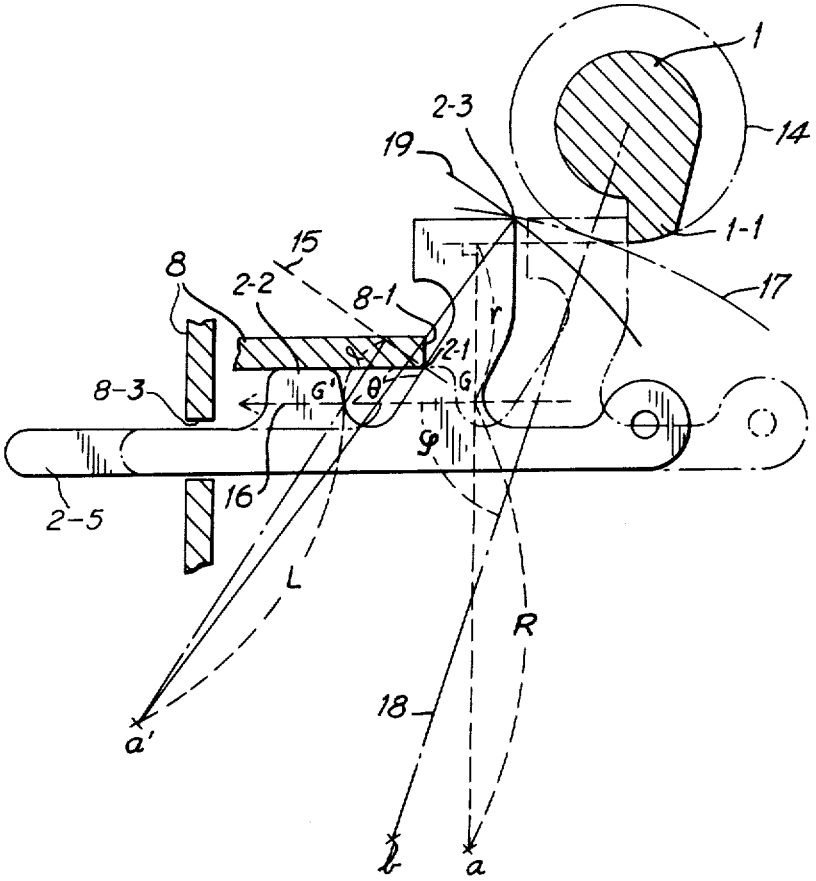
Figure 8:
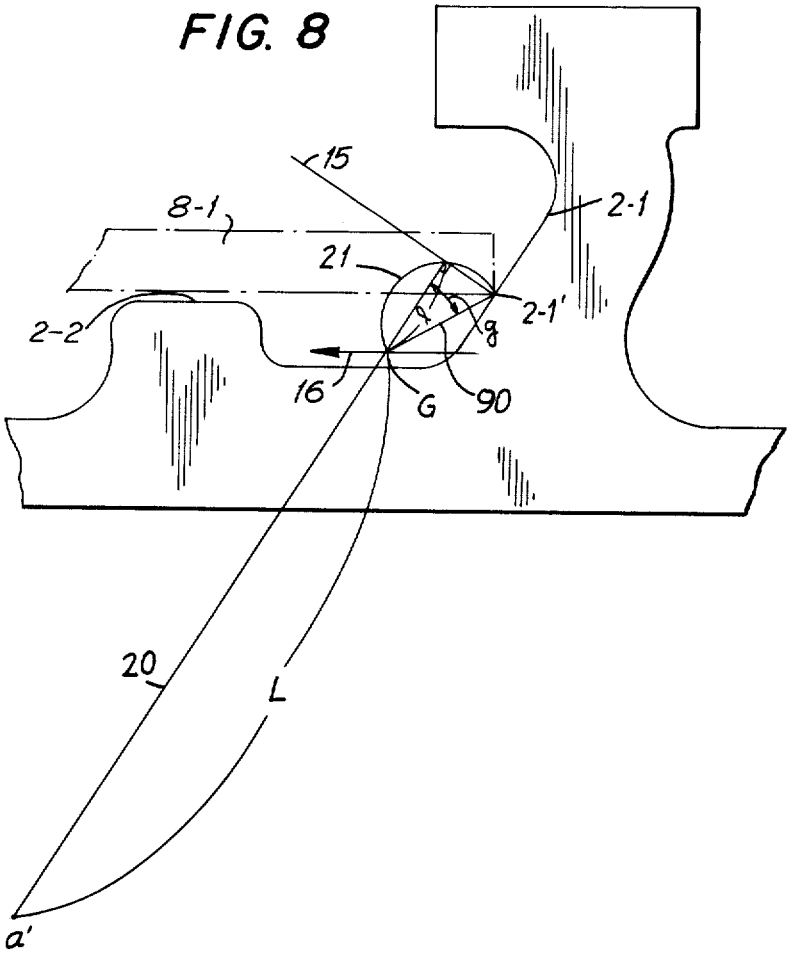

As shown in FIG. 7, in the case where the locus 17 of one end 2–3 of the trigger lever intersects the locus 14 of the pawl 1—1 when the trigger lever 2 strikes against the stopper 8–1, one end 2–3 enters in the locus of the pawl during rotation of the trigger lever, so double iking may occur. It is clear that in the situation as own in FIG. 7, the locus 17 of one end 2–3 of the gger lever intersects with the locus 14 of the pawl. ie axis of rotation of the trigger lever is along the line connecting said intersecting point with the center int of the ratchet wheel. The angle made by the line and the locus 16 of the center of gravity G is $\phi$. If the tary axis of the trigger lever is on point (a') as shown the solid line 19, one end 2–3 of the trigger lever is rely out of the locus 14 of the ratchet wheel tooth. At this time, the stopper or striking face 2–1, which is cated on the neck connecting the energy transmitting rtion of the trigger lever and the body portion ereof, is parallel to the line made by the rotary center the trigger lever and the center of gravity of the gger lever. The trigger lever struck by the ratchet ieel moves along the motion line 16. It is so designed at the angle of the stopper or striking face 2–1 of the gger lever is:

$$90° < \theta < 180°$$

In the arrangement according to the invention as own in FIG. 5, in order to ensure continuous printing, e regulating member 8–2 is spaced from the projec- on 2—2 on the trigger lever 2 when the trigger lever biased within the locus of the ratchet wheel 1 by the ning lever 10. Without said space, the trigger lever 2 ontacts with the guide member 8–2 when the timing ver 10 operates continuously. Therefore, precise con- iuous printing is impossible as the trigger lever can- ot return to the engaging portion with the ratchet heel 1 even after finishing printing due to the friction ss between the guide member 8–2 and the projection —2 of the trigger lever.

As described above, the printing method according the invention eliminates undesirable double striking case of continuous printing and to perform continu- us printing precisely. Thus a printer with high reliabil- y and high printing speed can be realized. Further, the rint drum can be miniaturized which results in com- act high speed flying printer.

It is apparent that if the radius of rotational move- ient after the trigger lever 2 strikes against the stopper -1 is smaller, it is more suitable for a compact printer. herefore it is necessary to make the value of L small the equation (2). k is a constant which is fixed by the iape and material of the trigger lever. Therefore, in rder to reduce the value of L, it is necessary to in- rease the value of l. Explaining this with reference to IG. 8, angle g is defined by line 90 and the locus 16 of ie center of gravity of the trigger lever. Since the line 0 connecting the center of the gravity G with the enter of rotation a' defines a right angle with the line f action 15 of the force, the locus of the intersecting oint between the two lines defining angle g defines the rc 21 whose diameter is the line 90 connecting G with -1'. Therefore, if the angle g becomes equal to zero he surface 2–1 of the trigger lever is parallel with the ine 90 connecting G with the striking point 2–1', l ecomes maximum, and accordingly the radius of the otation of the trigger lever attains minimum value.

In the flying printer according to our invention, print- ng energy is given by the continuously rotating ratchet vheel, so that the speed of the trigger lever is constant vhen it is struck by the tooth of the ratchet wheel. Therefore, the speed of the hammer lever struck by the rigger lever is determined by the speed of the ratchet wheel. In order to obtain sufficient printing energy, the mass of the hammer lever must be large. However, in the compact printer, it is required to reduce the size of the hammer lever. As a result, the height of the hammer lever is increased and the thickness of the hammer lever is the same with that of the hammer, which results in compact printer. The hammer and the hammer lever can be made from the same material. Thus the compact hammer body can be produced without decreasing the mass. The hammer body, consisting of the hammer and the hammer lever, can be manufactured in a single process such as pressing out. This is very advantageous for mass scale production.

The hammer 3 must precisely correspond to the character on the print drum 5, which necessitates the use of a guide member for guiding the hammer body. In the printer according to the invention, a guide plate 102 for hammer lever is provided. Said guide plate 102 is provided with the guide groove or guide hole arranged in zig-zag form as shown in FIG. 3-a to receive a projecting portion 106 of each hammer lever. This arrangement of the guide plate reduces the size of the printer due to the fact that the hammer body has uniform thickness.

The trigger lever 2 consists of a guide portion and a transmitting portion. The guide portion in linear form comprises the projection 2—2 for displacing the trigger lever through linear motion. Said guide portion moves slidably on the flat portion 8–2 of the trigger lever regulating plate. Said transmitting portion projected from said trigger lever engages with the ratchet wheel 2–3 and engages with the hammer lever at 2–4, and strikes against the trigger lever stopper 8–1 at neck portion 2–1. As the shape of the trigger lever is so constructed as above mentioned, its size is not increased longitudinally. It is also very advantageous for easy assembling as will be disclosed in the following. Unlike the conventional trigger lever, the connecting point between the transmitting portion and the trigger lever stopper forms one part of the transmitting portion. As a result, the shape of the trigger lever is simplified.

Figure 9:
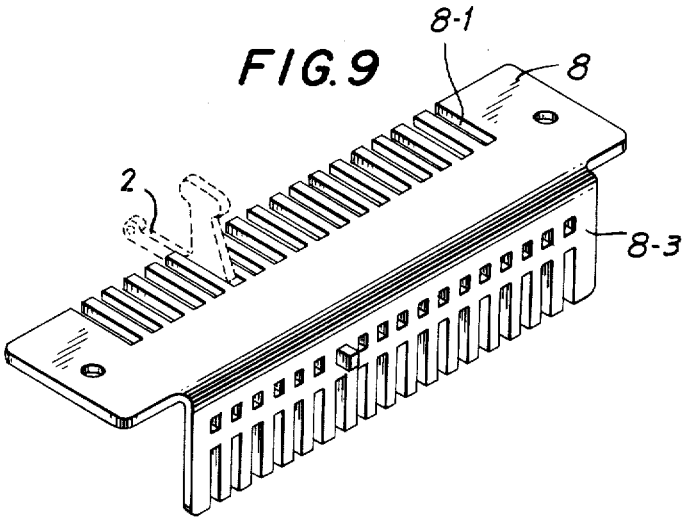
FIG. 9 is an enlarged view of the regulating plate of the flying printer of this invention.

The regulating plate 8 regulates the motion of the trigger lever to displace it toward the inside direction of the locus of the ratchet wheel tooth when the trigger lever is struck by the ratchet wheel. As shown in FIG. 9, the regulating plate 8 has guide hole 8–3 on one end, and the trigger lever stopper 8–1 on the other end. This construction makes it unnecessary to provide guide pins, and as a result, the number of the parts required is reduced, construction is simplified and assembly becomes easy.

Figure 10:
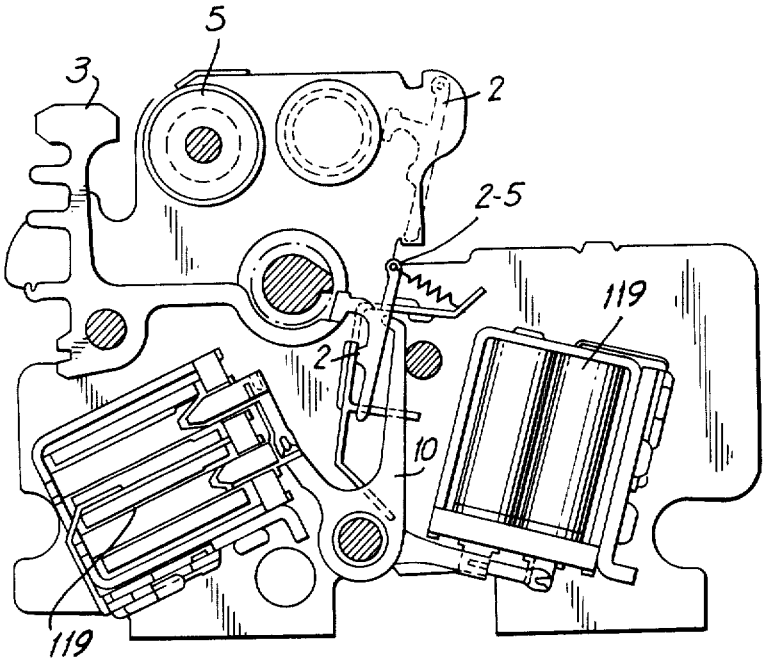
FIG. 10 is a sectional view of the flying printer of this invention.

In FIG. 10, one end 2–5 of the trigger lever 2 is projected from the other surrounding parts. Since the guide portion of the trigger lever is flat plate shaped, the guide hole of the regulating plate 8 is simple in its construction, so that trigger lever can be easily removed and inserted for replacement by picking up one end 2–5 after completing the assembling of the printer. This enables easy replacement and adjustment of the trigger lever after assembling.

Figure 11:
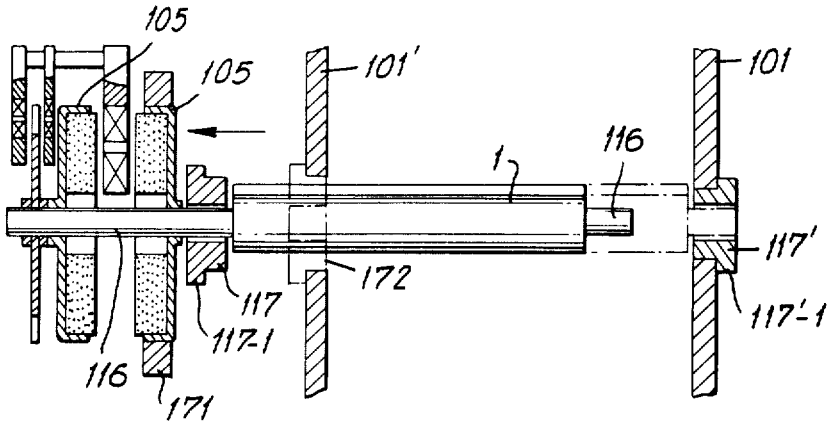
FIG. 11 is a schematic diagram showing the construction of the driving shaft of the flying printer of this invention.

FIG. 11 shows means for mounting the power shaft 116 coaxial with the ratchet wheel 1 on the main frames 101 ad 101' of the printer. The power shaft 116 is mounted on the main frames through the bearings 117 and 117' in such a manner that the flange portions 117–1 and 117'–1 are on the outside of the main frames 101 and 101'. Since the diameter of the hole 172 provided on the main frame is larger than that of the ratchet wheel 1, the ratchet wheel with motor mechanism 105 can be easily assembled and reassembled after completing the assembling. Generally, the cross sectional shape of the ratchet wheel is asymmetrical, so undesirable vibration is caused through the whole printer mechanism during high speed rotation. Therefore, it is necessary to eliminate the unbalancing of the printer including the motor and the ratchet wheel. In the printer according to the invention, the fly wheel 171 for balancing is mounted with the rotor of the motor. After eliminating the unbalance between the motor with fly wheel and the ratchet wheel, they are mounted as a unit. This construction is suitable for mass scale production. As shown in FIGS. 2 and 3, the shaft of the paper feeding roller 112 is inserted in the bearing through the opening 118 and 118′ provided on the upper portion of the main frames 101 and 101′. So assembly and replacement of parts is very easy. It is very advantageous for mass scale production.

Figure 12:
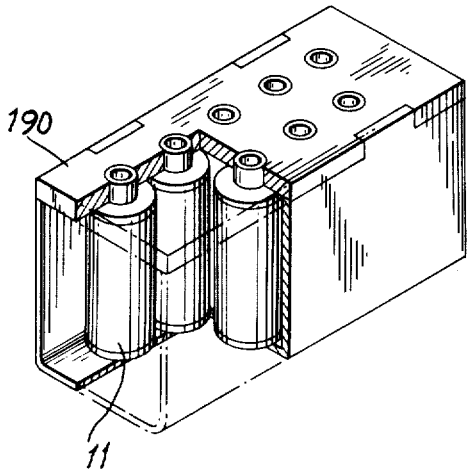
FIG. 12 is a perspective view showing the electromagnets and base member thereof of the invention.

The electromagnets 11 for operating the timing lever occupies a relatively large space in the printer. As shown in FIG. 10, in the printer according to this invention, the electromagnets are symmetrically disposed with the center line of the printer. Besides, as shown in FIG. 12, the electromagnets are mounted in zig-zag form on the base member 190 of the electromagnets, so a number of electromagnets are arranged in the narrow space.

Figure 13:
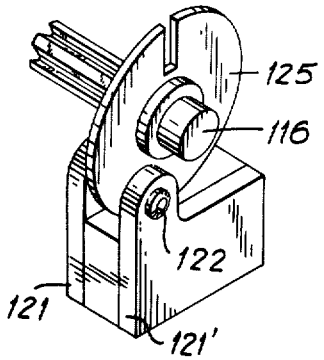
FIG. 13 is a partial perspective view of the detecting device of the flying printer of this invention.
Figure 13A:
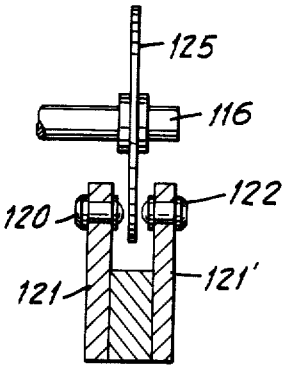
Figure 14:
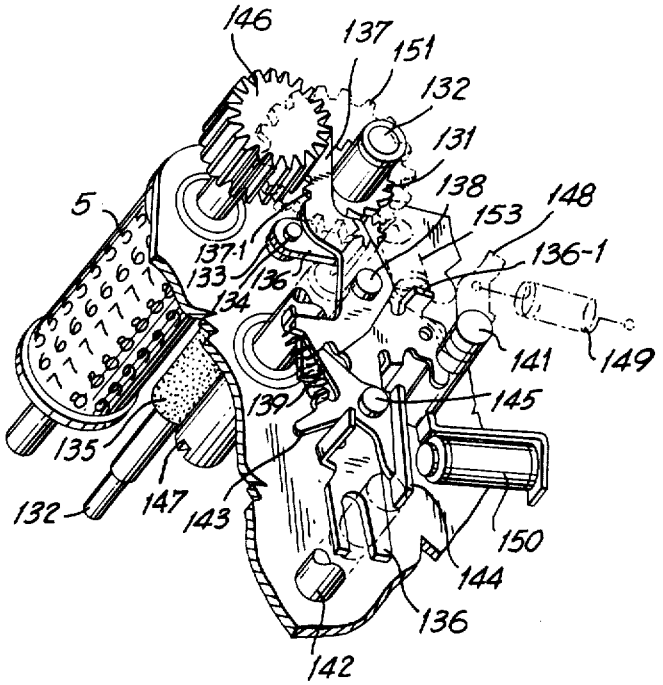
FIG. 14 is a partial perspective view showing paper feeding mechanism and ribbon feeding mechanism.

FIG. 13 shows a detecting device of the printer according to the invention which detects timing of the ratchet wheel and the print drum. The detecting device consists of the illuminating semiconductor 120, such as illuminating diode buried in the base plate 121 and the semi-conductor 122 for detecting photo-illumination mounted on the base plate 121′. Between the semi-conductors 120 and 122′, a shield plate 125 fixed on the ratchet wheel shaft 116 is provided. In the conventional type of the printer, such magnetic means as magnetic head is used for detecting position of the character to be printed. As these magnetic devices require large spaces, they cannot be incorporated in the compact printer. The detecting means, according to the invention, using the semi-conductor elements eliminates the above defect. Said semi-conductor elements are mounted in the circuit board.

Figure 25:
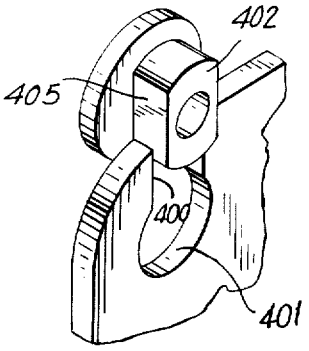
*FIGS. 25 and 26 show a simple embodiment for mounting the print drum on the main frames.*
Figure 26:
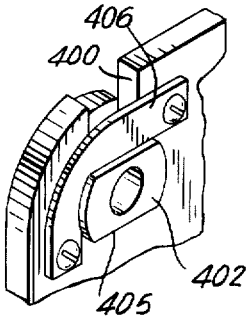

FIGS. 25 and 26 show a simple embodiment according to this invention for mounting the print drum on the main frames. This embodiment answers the requirement from the user to change the print drum for various character patterns. On the upper portion of the main frame 101 of the printer, according to the invention, inserting channel 400 is provided communicating between the edge of the frame and hole 401. The outer periphery of the bearing 402 for the shaft 403 of the print drum has flat planes 405 in parallel with each other as shown in FIGS. 25 and 26 for inserting the bearing 402 into the inserting channel 400. For mounting the print drum on the main frame as shown in FIG. 25, said flat plane 405 is faced against the channel portion and bearing 402 is slid down until it is inserted in the hole 401. Then as shown in FIG. 26, the bearing 402 is rotated about 90° from the inserting portion 400 of the main frame and L-shaped fitting plate 406 is fitted to strengthen the fixing of the bearing on the frame. This construction enables easy replacement of the print drum and the paper feeding roller. It is very advantageous for mass scale production. At the same time it is also very convenient for the user.

Reference is now made to the attachment of the printer, such as inked ribbon mechanism, color changing of ribbon and the driving device for feeding the paper.

FIGS. 14, 15, 16 and 17 are views of the paper feeding mechanism and ribbon feeding mechanism. 131 is a ratchet wheel for paper feeding fixed on the paper feeding shaft 132. 135 is a paper feeding roller made of rubber. Paper feeding ratchet lever 133 is rotatably mounted on the paper feeding lever 136 by means of pin 134 said ratchet lever being biased in the clockwise direction (FIG. 17) by spring 154. Said paper feeding lever 136 is biased upward by the spring 153. Saw-toothed lever 137 provided with saw teeth 137-1 is rotatably mounted on the paper feeding lever 136 by means of the pin 138 and is biased in the counterclockwise direction by the spring 139. Lever 143 cooperated with the electromagnets for paper feeding is rotatably mounted on the paper feeding lever 136 by means of the pin 145 and is biased in the clockwise direction by the spring 139. Magnetic plate 144 facing to the electromagnet 150 for feeding the paper is fixed on the lever 143. Wheel 146 is fixed coaxial with the print drum 152 and engages with the saw teeth 137-1 of the saw-toothed lever 137. Said wheel 146 rotates in the certain reduction transmited from the motor axis 147 through the intermediate wheel 151. Ribbon feeding lever 148 is biased in the clockwise direction by the spring 149 and is rotatably mounted on the axis 141.

Figure 15:
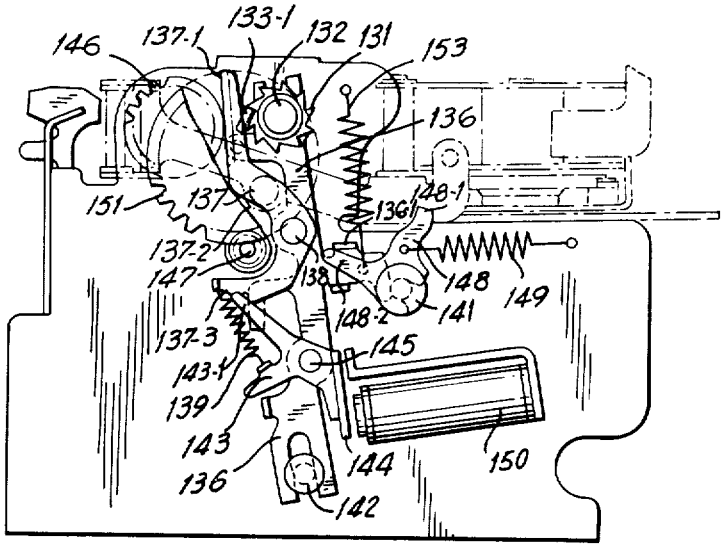
FIGS. 15, 16 and 17 show the operation of the arrangement of FIG. 14.

FIG. 15 shows the position wherein paper and ribbon are advanced and printing is completed. The wheel 146 mounted coaxially with the print drum 152 disengages from the saw-toothed lever 137 which is rotatably mounted on the paper feeding lever 136 by means of the pin 138, as one end 143-1 of the lever 143 engages with the notch 137-3 of the lever 137. Energy is transmitted from the motor 147 of the printer through the intermediate wheel 151 to the wheel 146 with certain reduction ratio to rotate the print drum continuously.

Figure 16:
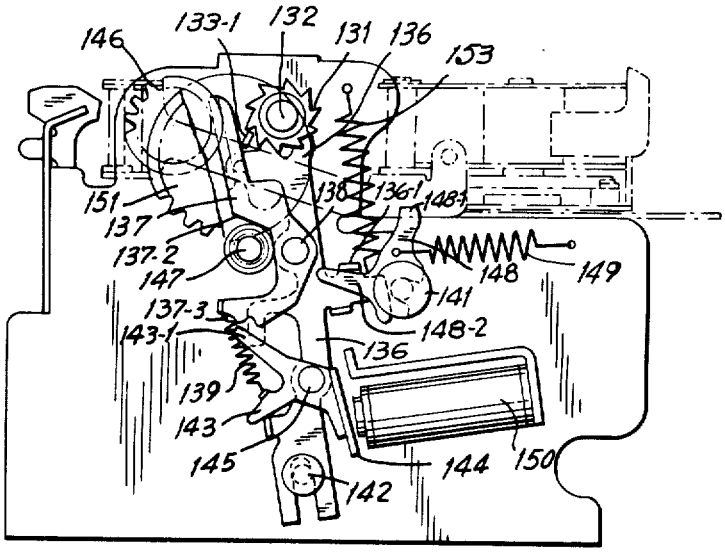

FIG. 16 shows the condition of the paper feeding mechanism and ribbon feeding mechanism when a signal is supplied to the electromagnets. When the signal is supplied to the electromagnet 150, the magnetic plate 144 is actuated and the lever 143 connected to the electromagnet rotates in the couterclockwise direction to feed the paper. One end 143-1 of the lever 143 disengages from the notch 137-3 of the lever 137 and the lever 137 rotates in the counterclockwise direction by means of the spring 139. As a result, the continuously rotating wheel 146 engages with the saw teeth 137-1. The paper feeding lever 136 is supplied energy for feeding the paper from the wheel 146 through the lever 137 and the lever 137 displaces downwardly guided by the pins 141 and 142 and the paper feeding shaft 132 to store the energy in the spring 153. Through the motion of the paper feeding lever 136, the projection 136-1 of the paper feeding lever 136 engages with the ribbon feeding lever 148 by its flat plane 148-2 and energy for feeding the ribbon is stored in the spring 149. When the paper feeding lever 136 is lowered to the predetermined position, the portion 137-2 of the lever 137 contacts the motor shaft 147. The lever 137 then rotates around the pin 138 in the clockwise direction and the saw teeth 137-1 are disengaged from the wheel 146. The notch 137-3 of the lever 137 and one end 143-1 of the lever 143 are cked as in the initial position by the force of the ring 139. The paper feeding lever 136 returns to its itial position by the energy stored in the spring 153. The mechanism for winding and reversing the inked ›bon is pushed by the flat portion 148–1 of the lever l8 by means of the energy stored in the spring 149 ıd winds the inked ribbon and reverses it.

Figure 17:
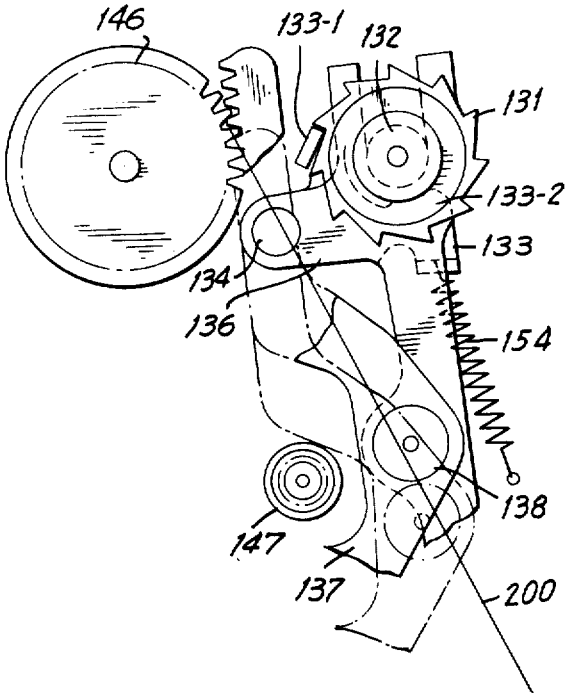

Referring to FIG. 17 for described the paper feeding echanism, the ratchet wheel 131 for feeding paper is tated one pitch by the lever 133 with pawl 133–1 to lvance the paper by one line. To advance the paper / exactly one line, the paper feeding mechanism is esigned in such a manner that the ratchet wheel 131 r feeding the paper is locked in the normal rotating rection by the pawl 133–1 of the lever 133, the tooth the ratchet wheel for paper feeding, the flat portion 33–2 of the lever 133 and the shaft 132 for paper eding. The paper feeding mechanism is thus designed prevent the paper feeding roller from rotating over ıe pitch due to moment of inertia of the paper feeding ›ller. Further, rotation of the paper feeding roller due the force applied in the normal rotational direction ır printing is checked.

Figure 18:
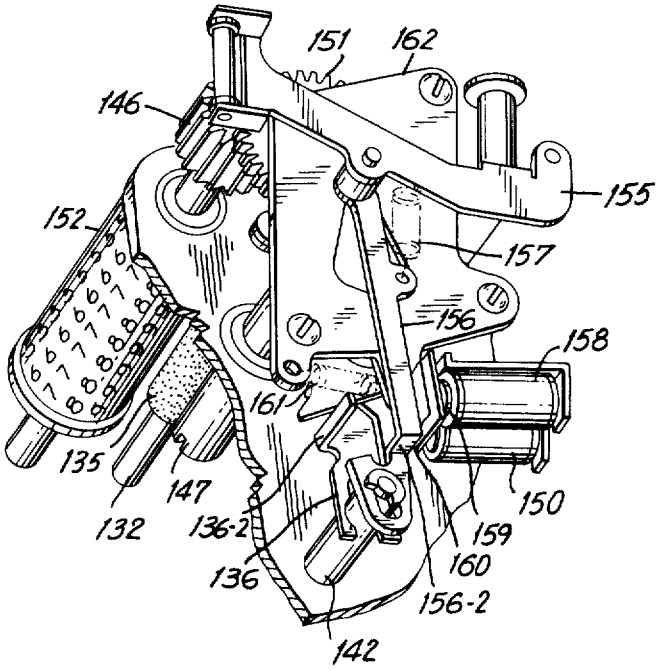
FIG. 18 is a perspective view showing color change of the inked ribbon.

FIG. 18 is a perspective view showing ribbon shift ıechanism according to this invention for changing ›lor of ribbon in registration with the hammers by ıifting the ribbon laterally. 136 is a paper feeding ver, 155 a ribbon guide lever, 156 a ribbon shift lever, 57 a ribbon shaft lever spring, 158 an electromagnet ›r ribbon shift, 160 a lever connected to a magnetic late 159 facing to the electromagnet 158 for ribbon ıift, 161 is a spring connected to the lever 160, and 62 a bridge having the intermediate wheel 151, the ›ring 157 and the spring 161 mounted thereon.

Figure 19:
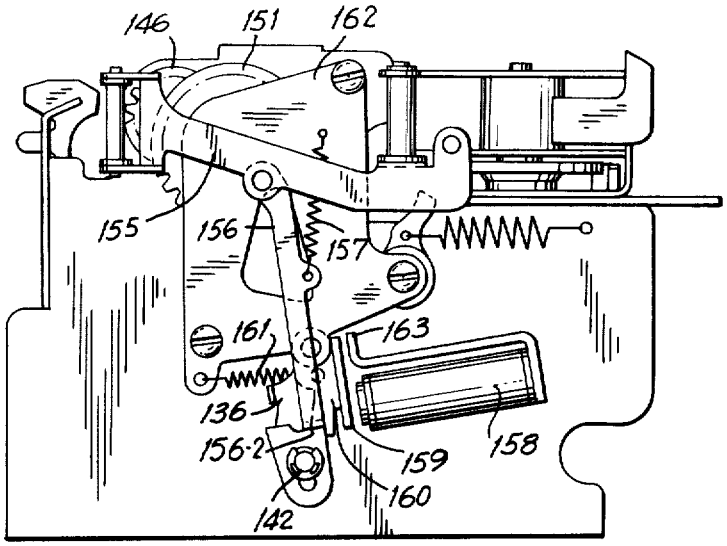
FIGS. 19 and 20 show the operation of the arrangement of FIG. 18.

Describing the operation of the inked ribbon of black nd red, FIG. 19 shows the condition for printing in lack color. The electromagnet 158 is not energized, so rinting is performed in black without displacing the ibbon shift lever 156 and the ribbon guide lever 156.

Figure 20:
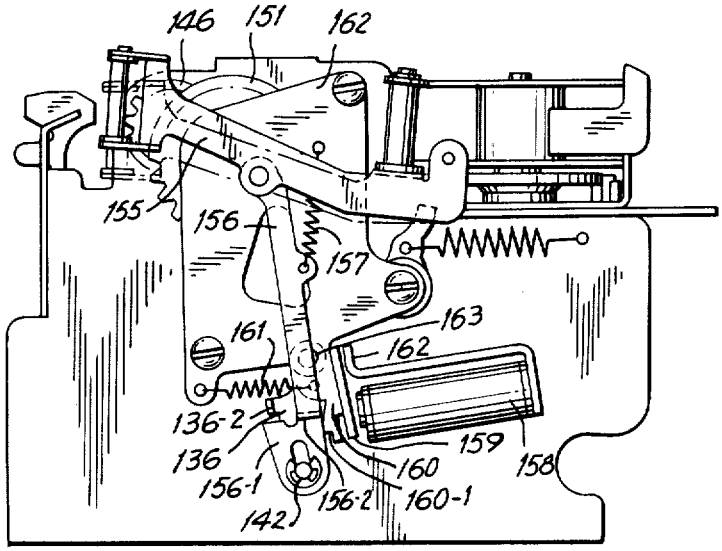

When the print command for red is not supplied to he electromagnet, the notch 160–1 of the lever 160 of he electromagnet engages with the notch 156–2 of the ibbon shift lever 156, and the ribbon guide lever 155 loes not operate. Therefore, ribbon shift is not performed. For printing in red, as shown in FIG. 20, the lectromagnet 158 is energized by the print command or red, and the magnetic plate 159 is actuated, and the ever 160 of the electromagnet for ribbon shift is rotated counterclockwise around the pin 163 to unlock he ribbon shift lever 156. The lever 156 moves the ibbon guide lever 155 upward by the force of the ›ring 157 and sets the red ribbon in printing position.

When the paper feeding lever moves downward by connecting the wheel 146 with the saw-toothed lever 137 after completing printing in red, the projection 136–2 of the paper feeding lever 136 is connected to ›ne end 156–1 of the ribbon shift lever, then the ribbon guide lever 155 and the ribbon shift lever 156 move to their original position. The notch 156–2 is locked again with the notch 160–1 of the lever 160. So the ribbon mechanism is in such a condition wherein printing is not performed in red.

Referring to FIG. 17, this describes the relative movement between the saw-toothed lever 137 and the wheel 146. When the saw-toothed lever 137 connects with the wheel 146 and moves downwardly substantially along the line of action 200, the rotary axis 138 of the saw-toothed lever 137 lies on the right (in FIG. 17) side of side line of action in the initial position. Accordingly, a moment of force is applied to the toothed-lever in the counterclockwise direction and the lever 137 rotates counterclockwise to connect the lever 137 more firmly with the wheel 146.

As the lever 137 continues to lower downwardly, the rotary shaft 138 of the lever 137 approaches said line of action 200 until it reaches to the right side of the line of action 200. At this moment, the lever 137 receives a moment in the clockwise direction from the wheel 146 and rotates clockwise. In our invention, the saw-toothed lever 137 is pressed down until the flat portion 147–2 of the lever 137 strikes motor shaft 147.

The driving device for the paper feeding mechanism substantially consists of the rotational body including ratchet wheel 146, a transmission device including paper feeding lever 136 and the saw-toothed lever 137, a first detent device including lever 143 of the electromagnet and spring 139, a first trigger device including electromagnet 150, a disconnecting device including motor shaft 147 and flat portion 137–2 of the saw-toothed lever, and first spring member for paper feeding including the spring 153. For the purpose of feeding the ribbon, a second lever 148 and spring 149 is provided. For the purpose of shifting the ribbon, a second detect device including shoulder 156–2 of the ribbon shift lever 156 and the electromagnet 160, a second spring member 149, and a second trigger device including the lever 158 is provided.

The foregoing structure is advantageous in that the energy for winding and reversing the inked ribbon and changing the color of inked ribbon and feeding the paper is supplied by the motor shaft of the printer, and the trigger device is used only for triggering of ribbon feeding, paper feeding and color changing of the inked ribbon, therefore the electromagnet can operate on minimum electric power. Thus, a driving device for paper feeding and ribbon feeding suitable for compact printer can be obtained.

In the invention, the transmitting device, the disconnecting device, and the first detent device are combined and mounted on one lever and the driving device for feeding the paper and the inked ribbon can be assembled as a unit independent from the printer body, therefore making assembly easy.

According to the invention, the wheel for driving the print drum also serves as a driving device for feeding paper and ribbon. Further, the disconnecting device also partially serves as a motor shaft of the printer. As a result, the number of parts required is reduced and construction is simplified.

The rotational body for driving the paper feeding device and the ribbon feeding device according to the invention are not directly connected to the motor shaft of the printer but are connected to the stepped down wheel of the motor shaft. Therefore, it is easy to self-start even at overload. Thus a printer with high reliability is obtainable.

The saw-toothed lever 137 according to the invention engages more firmly with the wheel 146 at the beginning of engagement and in the disengaging process it easily and surely disengages from the wheel 146 as the rotational force is applied to the saw-toothed lever in such a direction as to accelerate the disengagement. Further, force is not given excessively to the disengagement member 147, and wear of the disengaging member 147 is reduced.

Reference is now made to the device for guiding the paper according to the invention.

Figure 21:
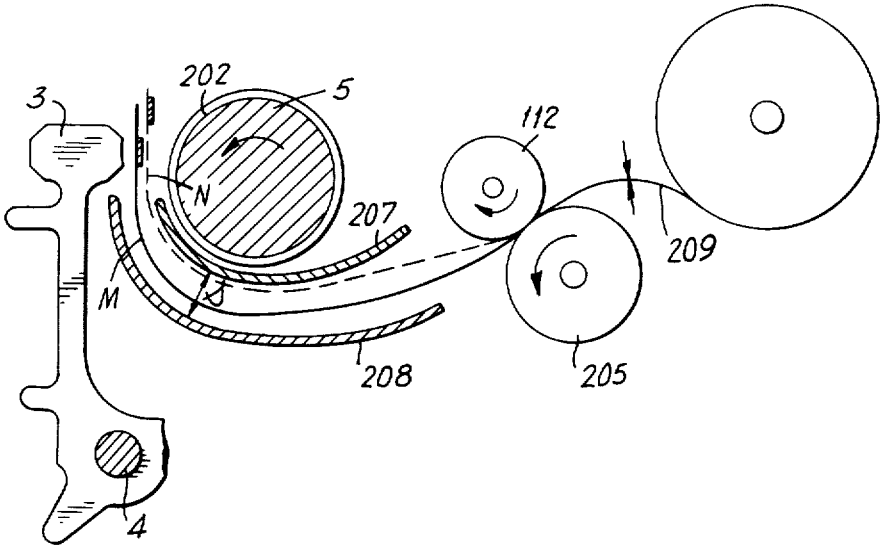
FIG. 21 is a sectional view showing the paper guide of a conventional type of flying printer.

FIG. 21 is a side view of one embodiment of the flying printer according to the invention. 5 is a print drum rotating continuously. Character 202 is disposed on the periphery of the print drum 5. Hammer 3 flies to the character on the print drum 5. 4 is a rotary shaft of the hammer, 205 a driving wheel for feeding the pressure sensitive paper step by step. 112 is a paper feeding roller pressed against said driving wheel through the paper. 207 and 208 are upper paper guide and lower paper guide respectively to feed the paper between the hammer and the print drum 1. 209 is a pressure sensitive paper, the thickness of which is d. A plurality of print hammers are disposed in parallel corresponding to the number of columns to be printed. Each hammer of the hammer body detects the position of the desired character on the continuously rotating print drum. When the character to be printed is placed in position, each hammer body rotationally flies to perform printing. During one rotation of the print drum 5, a whole one line is printed on the paper 209.

Figure 22:
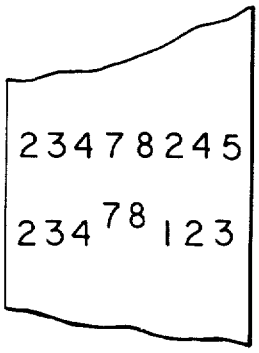
FIG. 22 shows the effect caused by the arrangement of FIG. 21.

Irregular printing as shown in FIG. 22 is caused due to the fact that the position of the paper is shifted from the normal position facing to the hammer 3 during one rotation of the print drum. This irregular printing increases as the gap between the upper paper guide 207 and the lower paper guide 208 is large compared with the paper thickness d. The paper 209 may pass the course M or N between the upper paper guide 207 and the lower paper guide 208, although the paper is fed in the predetermined position by the paper feeding wheel 205 and the paper feeding wheel to be driven 112. Accordingly, printing may be performed when the paper 209 is in M course at one time and N course at another time. As a result, characters do not come on a uniform line. If the gap(s) between the upper paper guide 207 and the lower paper guide 208 is equal to the paper thickness d, this irregular printing will never occur. However, it $s < d$, it is impossible to insert the paper in said gap. It is very difficult to make the gap(s) a little larger than the thickness (d) over the whole lengths of the paper guide in a mass scale production.

The present invention intends to eliminate this irregular printing by making the gap(s) nearly equal to the thickness (d).

Figure 23:
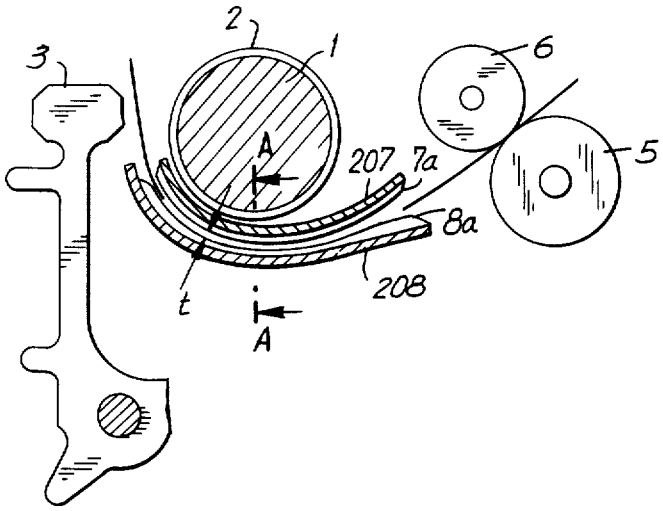
FIG. 23 is a sectional view showing a paper guide device according to the invention.
Figure 24:
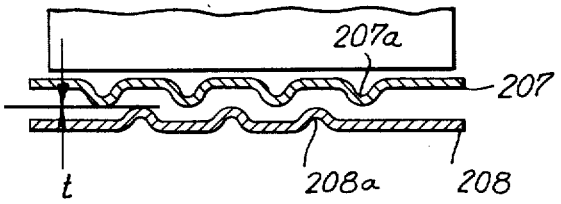
FIG. 24 is another sectional view showing a paper guide device according to the invention.

Referring to one embodiment according to the invention, FIG. 23 is a side view showing one embodiment and FIG. 24 is a partial cross sectional view of FIG. 23. The projections 207a and 208a are provided on the upper paper guide 207 and the lower paper guide 208 alternately as shown in FIG. 24. By making the gap (t) between the projection 207a and 208a nearly equal to the paper thickness, said irregular printing will be eliminated. In case of $t < d$ or $t \leq 0$ due to manufacturing error, the flexible paper can be inserted in said gap and advanced smoothly. Thus it is easy to apply mass scale production. Further, the paper can be advanced smoothly even if the printer is subjected to the rapid change in the environment temperature and the paper sticks to the paper guide when the temperature approaches the dew point.

As described above, the present invention provides a high speed flying printer with low electrical power consumption, which is useful as an output device such as an electronic desk calculator or cash register.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a printing device having printing means, drive means for said printing means and means for incrementally, longitudinally advancing paper relative to said printing means, the improvement in said paper advancing means which comprises a continuously rotating member driven by said drive means; a transmitting member displaceable between a first rest position and a second position; first coupling means operatively engaging said transmitting member and said rotating member for the selective displacement of said transmitting member between said first and second positions in response to the rotation of said rotating member, said first coupling means including a first lever mounted on said transmitting member for pivotable displacement into and out of operative engagement with said rotating member; a first spring means biasing said first lever into said operative engagement; first detent means mounted on said transmitting means for releasably retaining said first lever out of operative engagement with said rotating member; and selective releasing means coupled to said first detent means for selectively releasing said first detent means to permit the displacement of said first lever into operative engagement with said rotating member for the displacement of said transmitting member; second spring means coupled to said transmitting member for the storage of energy during the displacement thereof between said first and second positions; means disengaging said transmitting member and said rotating member at said second position to release said transmitting member for return to said first position in response to the energy stored in said second spring means; paper engaging means for the displacement of said paper; and second coupling means operatively engaging said transmitting means and said paper engaging means during [ said ] displacement [ from said second to said first position ] *of said transmitting means* for operative displacement of said paper engaging means.

2. A printing device as recited in claim 1, wherein said disengagement means includes a fixed member in the path of said first lever during the displacement of said transmitting member from said first to said second position for pivotably displacing said first lever out of operative engagement with said rotating member and into locking engagement with said first detent means at said second position.

3. A printing device as recited in claim 2, wherein said first lever includes an inclined camming surface for engagement against said fixed member.

4. A printing device as recited in claim 3, wherein said driving means includes a drive shaft, said drive shaft defining said disengaging means fixed member.

5. A printing device as recited in claim 1, wherein said rotating member is a gear, said first lever being formed with a portion defining a rack for cooperation with said gear for the displacement of said transmitting ıember.

6. A printing device as recited in claim 1, wherein ıid selective releasing means includes solenoid means ›r the selective displacement of said first detent ıeans.

7. A printing device as recited in claim 1, wherein ıid printing device is a flying printer having a continuusly rotating print drum and a rotating shaft supportıg said print drum, said rotating member being ıounted on said print drum shaft for rotation thereith.

8. A printing device as recited in claim 1, including n inked ribbon, ribbon engaging means for incremenılly, longitudinally advancing said ribbon relative to ıid printing means; and means operatively coupling ıid ribbon advancing means and said transmitting ıember for the longitudinal displacement of said ribon in response to the displacement of said transmitng member from its second to its first position.

9. A printing device as recited in claim 8, wherein aid means coupling said transmitting member and said ibbon advancing means includes a second pivotably ıounted lever having a pair of arms, a first of said arms ›peratively engaging said transmitting member for the ›ivotable displacement of said second lever between irst and second positions corresponding to the first and econd positions of said transmitting member, said second arm being operatively coupled to said ribbon advancing means; and spring means coupled to said second lever for biasing said second lever to its first position.

10. A printing device as recited in claim 8, including ribbon shift means for selectively laterally displacing said ribbon relative to said printing device, said ribbon shift means including ribbon support means pivotably mounted for displacement between first and second positions representative of two laterally shifted positions of said ribbon; means biasing said ribbon support means in said second position; second detent means coupled to said ribbon support means for releasably retaining said ribbon support means at said first position; means for the selective displacement of said second detent means to release said ribbon support means for displacement from its first to its second position; and means coupling said transmitting member and said ribbon support means for displacing said ribbon support means from its second to its first position at which it is captured by said second detent means during the displacement of said transmission member from its first to its second position.

11. A printing device as recited in claim 10, wherein said means for selectively releasing said second detent means includes second solenoid means.

* * * * *